United States Patent [19]

Antlfinger et al.

[11] 4,018,966

[45] Apr. 19, 1977

[54] COMPOSITIONS CONTAINING A REACTIVE HYDROXYL-CONTAINING VINYL CHLORIDE POLYMER

[75] Inventors: George J. Antlfinger, Avon Lake; Richard F. Reinhart, Elyria, both of Ohio

[73] Assignee: The B. F. Goodrich Company, Akron, Ohio

[22] Filed: May 27, 1975

[21] Appl. No.: 581,169

Related U.S. Application Data

[63] Continuation of Ser. No. 313,603, Dec. 8, 1972, abandoned.

[52] U.S. Cl. .......................... 428/423; 260/32.8 N; 260/32.8 R; 260/853; 260/859 R; 428/460; 428/463; 526/320
[51] Int. Cl.$^2$ ..................... C08K 5/07; C08L 27/06
[58] Field of Search ......... 260/32.8 N, 853, 86.1 R, 260/80.75, 859 R; 526/320; 428/423, 460, 463

[56] References Cited

UNITED STATES PATENTS

| | | | |
|---|---|---|---|
| 2,923,653 | 2/1960 | Matlin | 260/853 |
| 3,203,918 | 8/1965 | Goldberg | 260/86.1 R |
| 3,269,994 | 8/1966 | Horn | 260/80.75 |
| 3,884,887 | 5/1975 | Montgomery | 260/853 |

*Primary Examiner*—Theodore Morris
*Attorney, Agent, or Firm*—Roy P. Wymbs

[57] ABSTRACT

Solvent resistant films are obtained from compositions containing a polymer of vinyl chloride, vinylidene chloride or vinyl acetate, and a hydroxyl-containing monomer copolymerizable therewith, and a thermosetting resin of the group of urea-formaldehyde, melamine and isocyanate resins.

17 Claims, No Drawings

COMPOSITIONS CONTAINING A REACTIVE HYDROXYL-CONTAINING VINYL CHLORIDE POLYMER

This is a continuation of application Ser. No. 313,603, filed Dec. 8, 1972, now abandoned.

BACKGROUND OF THE INVENTION

It is well known that copolymers containing vinyl chloride, vinyl acetate and vinyl alcohol are useful materials in forming coating compositions for wood, metal and glass. These copolymers, when compounded with thermosetting resins, have found utility in coating metal whereby strong flexible chemically resistant films are formed. While these compositions and the resulting films usually applied in the form of lacquers and paints, have been widely accepted, the preparation of such copolymers is expensive and time consuming. The copolymers are prepared by copolymerizing vinyl chloride and vinyl acetate in suspension, emulsion or solution systems with a free-radical generating catalyst. Thereafter the resulting copolymers are treated to hydrolysis conditions to partially hydrolyze the acetate portion of the copolymer. The presence of hydroxyl groups in the copolymer is essential to have proper reactivity with the thermosetting resins. Elimination of this hydrolysis step would be advantageous from a production and economic point of view. Further, in such a system the comonomer employed must be one capable of partial hydrolysis.

Accordingly, it would be advantageous to employ hydroxyl-containing monomers, copolymerizable with vinyl chloride and copolymers of vinyl chloride and other polymerizable monoolefinically unsaturated vinylidene monomers containing the $CH_2=C<$ grouping, to obtain copolymers having reactivity with thermosetting resins and thereby eliminate the costly hydrolysis step.

SUMMARY OF THE INVENTION

We have unexpectedly found that certain hydroxyl-containing monoolefinic monomers can be directly copolymerized with copolymers of vinyl chloride and vinylidene chloride and copolymers of vinyl chloride and vinyl acetate using known polymerization techniques. Surprisingly, these hydroxyl-containing copolymers have reactivity with urea-formaldehyde, melamine and isocyanate resins when heated in film form, such as a coating on metals, and the like. The hydroxyl-containing monomers useful in the present invention are hydroxypropyl acrylate and hydroxypropyl methacrylate. These monomers produce soluble copolymers which exhibit very good heat stability.

DETAILED DESCRIPTION

In the practice of the present invention, the polymers are preferably prepared by use of the aqueous suspension polymerization technique. However, the polymers may be made using emulsion and solution polymerization systems. In fact, when vinyl acetate is employed as one of the comonomers, it is preferred to use solution polymerization in an organic solvent, such as acetone, methyl ethyl ketone, and the like.

In making the copolymers, from about 40% to about 90% by weight of vinyl chloride, from about 10% to about 60% by weight of vinylidene chloride or vinyl acetate, and from about 2% to about 20% by weight of the hydroxyl-containing monomer are charged to the polymerization reaction vessel along with the reaction medium. A free-radical generating catalyst is added and the polymerization reaction started and continued at a temperature in the range of 40° C. to about 70° C. until complete or until the desired percentage conversion is obtained.

When employing a suspension polymerization system, the liquid reaction medium or media are generically called aqueous reaction media which comprise water alone or intimate admixtures of water with one or more organic solvents, such as the alcohols including methyl, ethyl, propyl, butyl, amyl, hexyl, heptyl, octyl, methyl hexyl, dimethyl hexyl, and other alcohols, including the polyhydric alcohols, such as glycol, glycerol, and the like; an alkyl nitrile, such as acetonitrile, ethylene cyanohydrin, and the like; the ethers, such as methyl, ethyl, propyl, butyl and higher ethers, and the like; the ketones, such as acetone, methyl ethyl ketone, cyclohexanone, and the like.

It is advantageous, although not essential, to add to the liquid reaction media a small amount of a dispersant in order to obtain a more complete and uniform dispersal of the monomers and catalyst throughout the reaction media prior to and during the polymerization of the monomers. Any of the well known dispersants operative in aqueous media may be employed. These include, among others, methyl cellulose, polyvinyl alcohol, dodecylamine hydrochloride, sodium lauryl sulfonate, lauryl alcohol, sodium lauryl sulfate, sorbitan monolaurate polyoxyethylene, nonylphenoxy polyoxyethylene ethanol, hydrolyzed polyvinyl acetate, etc.

As mentioned above, the polymerization reaction is normally carried out under pressure in the presence of a suitable monomer-soluble, water-insoluble free-radical producing catalyst. Suitable catalysts for use in the present invention include, by way of example, lauryl peroxide, caprylyl peroxide, cyclohexane sulfonyl peroxide, acetyl cyclohexyl sulfonyl peroxide, acetyl sec-heptyl sulfonyl peroxide, hydrogen peroxide, methyl hydroperoxide, ethyl hydroperoxide, propyl hydroperoxide, butyl hydroperoxide, or other alkyl hydroperoxides, cumene hydroperoxide, isopropyl percarbonate, sec-butyl peroxydicarbonate, isobutyl peroxydicarbonate, potassium persulfate, and the like. The amount of the catalyst used is normally kept as low as possible consistent with a good polymerization rate. The catalyst chosen may also be used in combination with one or more other catalysts. The amount of catalyst used will depend upon the particular catalyst or catalysts chosen and the temperature of the polymerization reaction. Usually an amount of catalyst in the range of 0.001 weight part to about 1.0 weight part based on 100 weight parts of monomers is sufficient.

It was further found that the hydroxyl-containing polymers had enhanced reactivity with the thermosetting resins when from about 6 to about 10 parts by weight, based on the total weight of the monomers, of a highly polar monomer was incorporated therein. Suitable polar monomers, for use in the present invention, are the alkyl esters of acrylic and methacrylic acids wherein the alkyl group contains from 1 to 4 carbon atoms. Examples of such polar monomers are methyl acrylate, ethyl acrylate, n-butyl acrylate, methyl methacrylate, ethyl methacrylate, butyl methacrylate, etc. More than one polar monomer may be employed in the copolymerization. Particularly effective monomers are methyl methacrylate and n-butyl acrylate.

The thermosetting resins, namely, urea formaldehyde, melamine and isocyanate resins, are readily mixed with the hydroxyl-containing polymers by conventional dry and plasticol techniques. It is preferred, however, to mix the polymers and resins in an organic solvent therefor since then the resultant solution is ready for application as a coating or paint, and the like. Particularly useful solvents are the aliphatic ketones including methyl ethyl ketone, acetone, and the like, and which may also contain aromatic hydrocarbons such as toluenes, xylenes, and the like. The solutions or compositions contain, based on 100 weight parts of the hydroxyl-containing copolymer, from 5 to 100 parts by weight, preferably 10 to 40 parts by weight, of the thermo-setting resin.

After application of the coating or composition of the instant invention, the same is dried or heated at temperatures above 100° F., and usually in the range of 200° F. to 400° F. Depending upon the polymers or resins in the composition, the time of heating will vary from about 5 minutes to about 30 minutes. It has been found that with most of the compositions, heating the coating for approximately 15 minutes at a temperature of about 300°–400° F. is satisfactory for most all applications.

If desired, small amounts of vinyl chloride polymer plasticizers may be added to the compositions as well as small amounts of pigments. Among the suitable pigments are alumina powder, titanium dioxide, zinc oxide, antimony oxide, chromic oxide, carbon black, red lead, white lead, iron oxide, heavy metal chromates, cadmium yellow and cadmium red, and the like. If desired or needed other pigments, stabilizers, fillers, extenders, and the like may be added.

The following specific examples are given by way of illustration and not limitation. In the examples all parts and percents are by weight unless otherwise indicated.

EXAMPLE I

In this Example all of the copolymers were made by suspension polymerization in an aqueous medium employing methyl cellulose as a dispersant and caprylyl peroxide as catalyst. The temperature of the polymerization reaction was 60° C. The time of reaction and conversion are given in Table I below. In the Table, the parts of the monomers were the composition as charged to the reactor.

TABLE I

| SAMPLE NO. | 1 | 2 | 3 | 4 | 5 | 6 |
|---|---|---|---|---|---|---|
| Vinyl Chloride | 50 | 45 | 50 | 45 | 47 | 43 |
| Vinylidene Chloride | 40 | 35 | 40 | 35 | 35 | 34 |
| Hydroxypropyl Acrylate | 10 | 10 | | | | |
| Hydroxypropyl Methacrylate | | | 10 | 10 | 10 | 13 |
| n-Butyl Acrylate | | | | | | 8 |
| Methyl Methacrylate | | 10 | | 10 | | 10 |
| Reaction Time (Hours) | 28 | 22 | 24 | 26 | 21 | 25 |

TABLE I-continued

| SAMPLE NO. | 1 | 2 | 3 | 4 | 5 | 6 |
|---|---|---|---|---|---|---|
| % Conversion | 60 | 80 | 50 | 98 | 64 | 98 |

Each of the copolymers, Nos. 1 through 5, inclusive, was dissolved in methyl ethyl ketone with 10 parts, based on 100 parts of copolymer, of a urea formaldehyde resin (Uformite F-240N) and in a separate solution with 10 parts of hexamethoxy methyl melamine resin (Cymel 301). Copolymer No. 6 was dissolved in methyl ethyl ketone with 10 parts, based on 100 parts of copolymer, of a polymethylene polyphenyl isocyanate having 2.6 isocyanate groups per molecule (Mondur MR). The solutions all contained 25% total solids. Films 0.006 inch thick were cast on aluminum panels with each of the copolymer-thermosetting resin solutions and then baked for 15 minutes at 300° F. Thereafter the compositions were tested for resistance to methyl ethyl ketone (MEK) by keeping the coated surface of the panel wetted with the solvent and rubbing vigorously with a saturated MEK pad. The time necessary to break through the film or coating to expose the metal was noted and recorded. In the case of those samples showing good resistance to MEK after 5 minutes, the rubbing was discontinued and the results reported as greater than 5 minutes. The test results are tabulated in the following Table II.

TABLE II

| SAMPLE NO. | 1 | 2 | 3 | 4 | 5 | 6 |
|---|---|---|---|---|---|---|
| Copolymer | 100 | 100 | 100 | 100 | 100 | 100 |
| Uformite F-24oN | 10 | 10 | 10 | 10 | 10 | |
| MEK Solvent Resistance | 45 Sec. | 60 Sec. | 30 Sec. | 75 Sec. | 100 Sec. | |
| Cymel 301 | — | — | 10 | 10 | 10 | |
| MEK Solvent Resistance | — | — | 5 Min. + | 5 Min. + | 5 Min. + | |
| Mondur MR | | | | | | 10 |
| MEK Solvent Resistance | | | | | | 5 Min. + |

All samples showed good resistance to MEK with urea formaldehyde resin and particularly good resistance with melamine and isocyanate resins.

EXAMPLE II

In this Example the copolymers were made employing the solution polymerization technique. The catalyst employed was caprylyl peroxide and the temperature of the polymerization reaction was 60° C. The polymerization medium, time of reaction and conversion are given in Table III below. Since the copolymers were prepared in solution it was only necessary to mix in the thermosetting resin and then coat aluminum panels, as was done in Example I. However, in this Example the compositions were tested for resistance with a pad saturated with the solvent used in the polymerization reaction. Again, as in Table I, the parts of the monomers were the composition as charged to the reactor.

TABLE III

| SAMPLE NO. | 7 | 8 | 9 |
|---|---|---|---|
| Vinyl Chloride | 50 | 70 | 50 |
| Vinylidene Chloride | 40 | | 40 |
| Vinyl Acetate | | 20 | |
| Hydroxypropyl Methacrylate | 10 | 10 | 10 |
| Solvent Medium | Acetone | Acetone | MEK |
| Reaction Time (Hours) | 24 | 24 | 24 |
| % Conversion | 48 | 57 | 43 |
| Uformite F-240N | 10 | 10 | 10 |
| Solvent Resistance | 105 Sec. | 60 Sec. | 12 Sec. |

TABLE III-continued

| SAMPLE NO. | 7 | 8 | 9 |
|---|---|---|---|
| Cymel 301 | — | 10 | 10 |
| Solvent Resistance | — | 5 Min. + | 5 Min. + |

These results demonstrate that the copolymers containing hydroxyl groups can be solution polymerized and obtain reactivity with thermosetting resins and also, vinyl acetate can be substituted for vinylidene chloride.

Lacquers or coatings of the present invention are particularly useful in providing solvent resistant inner coatings in metal cans. Also, solvent resistant protective coatings in the form of paint compositions are readily provided for metal articles, particularly in marine and industrial applications. Further, coating compositions of the present invention are useful as recording tape coatings.

Although the invention has been described in terms of its specific embodiments, certain modifications and equivalents will be apparent to those skilled in the art and are intended to be included within the scope of the present invention, which is to be limited only by the reasonable scope of the appended claims.

We claim:

1. A coating composition comprising an organic solvent having dissolved therein a hydroxyl-containing terpolymer comprised of in copolymerized form (a) from about 40% to about 90% by weight of vinyl chloride, (b) from about 10% to about 60% by weight of vinylidene chloride or vinyl acetate, and (c) from about 2% to about 20% by weight of hydroxypropyl acrylate or hydroxypropyl methacrylate, and a reactive thermosetting resin selected from the group consisting of urea-formaldehyde resins, melamine resins, and isocyanate resins.

2. A composition as defined in claim 1 wherein the thermosetting resin is urea formaldehyde resin.

3. A composition as defined in claim 1 wherein the thermosetting resin is hexamethoxy methyl melamine resin.

4. A composition as defined in claim 1 wherein (c) is hydroxypropyl acrylate.

5. A composition as defined in claim 1 wherein (c) is hydroxypropyl methacrylate.

6. A composition as defined in claim 1 wherein the hydroxyl-containing terpolymer contains in copolymerized form an alkyl ester of acrylic acid or methacrylic acid wherein the alkyl group contains from 1 to 4 carbon atoms.

7. A composition as defined in claim 1 wherein the organic solvent is methyl ethyl ketone.

8. A composition as defined in claim 1 wherein the organic solvent is acetone.

9. A composition as defined in claim 1 wherein (b) is vinylidene chloride and (c) is hydroxypropyl methacrylate.

10. A composition as defined in claim 6 wherein the alkyl ester is n-butyl acrylate.

11. A composition as defined in claim 6 wherein the alkyl ester is methyl methacrylate.

12. A composition as defined in claim 6 wherein the organic solvent is methyl ethyl ketone and wherein the thermosetting resin is a urea formaldehyde resin.

13. A composition as defined in claim 12 wherein (b) is vinylidene chloride, (c) is hydroxypropyl methacrylate and the alkyl ester is methyl methacrylate.

14. A solvent resistant film of claim 1.

15. The composition of claim 1 coated on a metal substrate.

16. The method of providing a solvent resistant coating on a metal substrate which comprises depositing from an organic solvent solution on said metal a composition comprising a hydroxyl-containing terpolymer comprised of in copolymerized form (a) from about 40% to about 90% by weight of vinyl chloride, (b) from about 10% to about 60% by weight of vinylidene chloride or vinyl acetate, and (c) from about 2% to about 20% by weight of hydroxypropyl acrylate or hydroxypropyl methacrylate, and a reactive thermosetting resin selected from the group consisting of urea-formaldehyde resins, melamine resins, and isocyanate resins and thereafter heating the resulting coating of a temperature above 100° F. for a period of about 5 minutes to about 30 minutes.

17. The composition as defined in claim 1 wherein the thermosetting resin is present in an amount of from 5 to 100 parts by weight based on 100 weight parts of the hydroxyl-containing terpolymer.

* * * * *